United States Patent [19]

Nordhaus, John P.

[11] Patent Number: 4,721,272
[45] Date of Patent: Jan. 26, 1988

[54] EMERGENCY REMOVER DEVICE FOR EJECTING AIRCRAFT CANOPIES

[75] Inventor: Nordhaus, John P., Northbrook, Ill.

[73] Assignee: Scot, Incorporated, Downers Grove, Ill.

[21] Appl. No.: 6,136

[22] Filed: Jan. 23, 1987

[51] Int. Cl.⁴ .............................................. B64C 1/14
[52] U.S. Cl. ............................... 244/122 AF; 244/121
[58] Field of Search ............ 244/122 R, 122 AF, 121, 244/122 AE; 60/632, 636

[56] References Cited

U.S. PATENT DOCUMENTS

| | | | |
|---|---|---|---|
| 2,780,961 | 2/1957 | Musser et al. | 244/121 |
| 2,873,648 | 2/1959 | Musser et al. | 244/121 |
| 2,924,404 | 2/1960 | McNally | 244/122 AF |

Primary Examiner—Joseph F. Peters, Jr.
Assistant Examiner—Rodney Corl
Attorney, Agent, or Firm—Mann, McWilliams, Zummer & Sweeney

[57] ABSTRACT

An emergency remover device for ejecting an aircraft canopy preliminary to in-flight ejection of personnel from the aircraft, which device is a ballistic gas actuated telescoping multi-cylinder assembly that is normally keyed in retracted relation and comprises an inner cylinder, an intermediate cylinder, and an outer cylinder, with the assembly arranged for upright incorporation in the usual aircraft canopy actuating extensible and retractable strut, in which assembly the outer cylinder is fixed against movement relative to the aircraft on emergency actuation of the device, and the inner and intermediate cylinders act under ballistic gas pressure released within the device to effect the imposition on the canopy of the needed unbalanced force in a more or less uniform manner to effect the application to the canopy of maximized release momentum prior to the remover device to effect the application to the canopy of maximized release momentum prior to the remover device reaching its extending length, and to provide for release of the canopy therefrom without detracting from such momentum.

11 Claims, 7 Drawing Figures

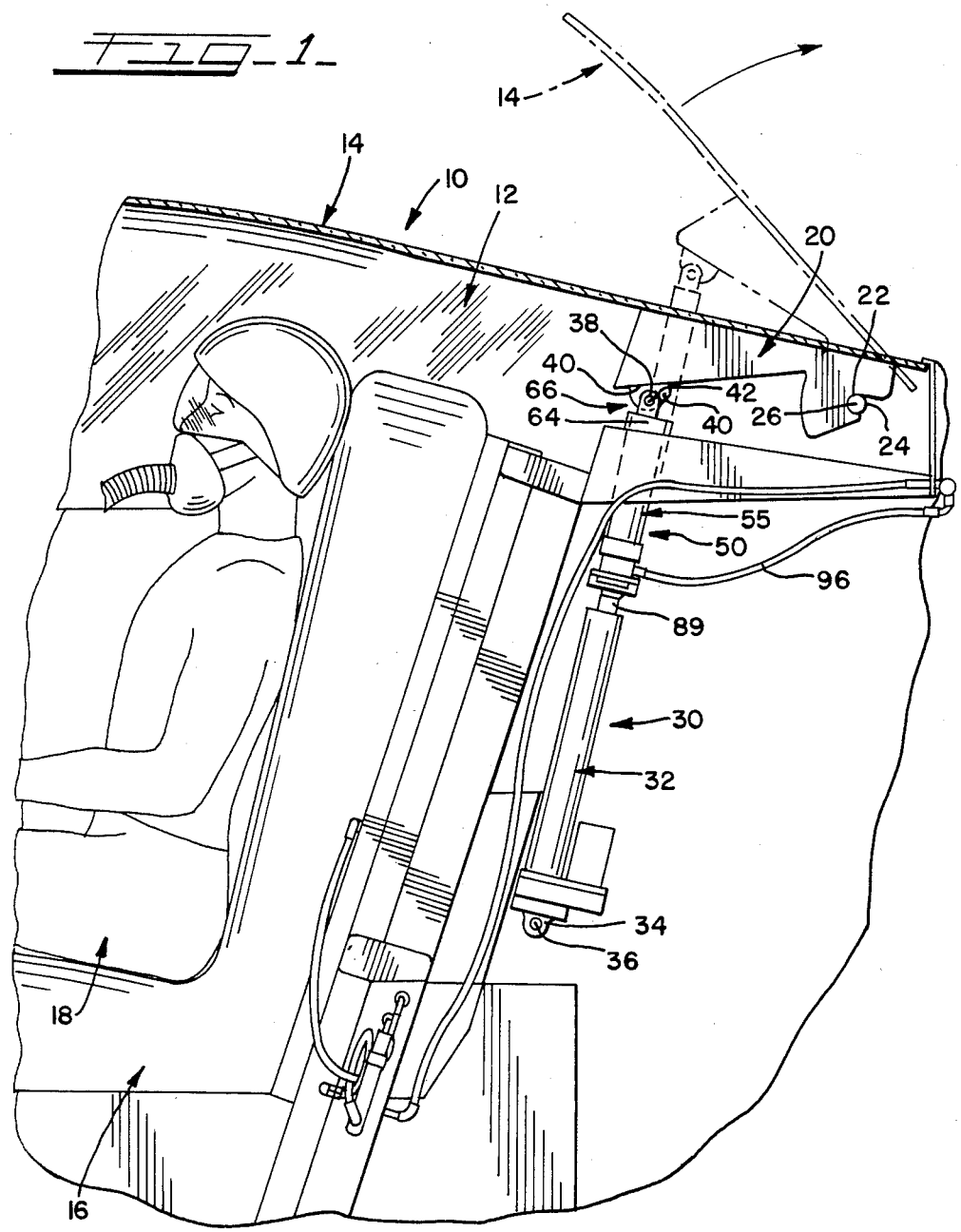

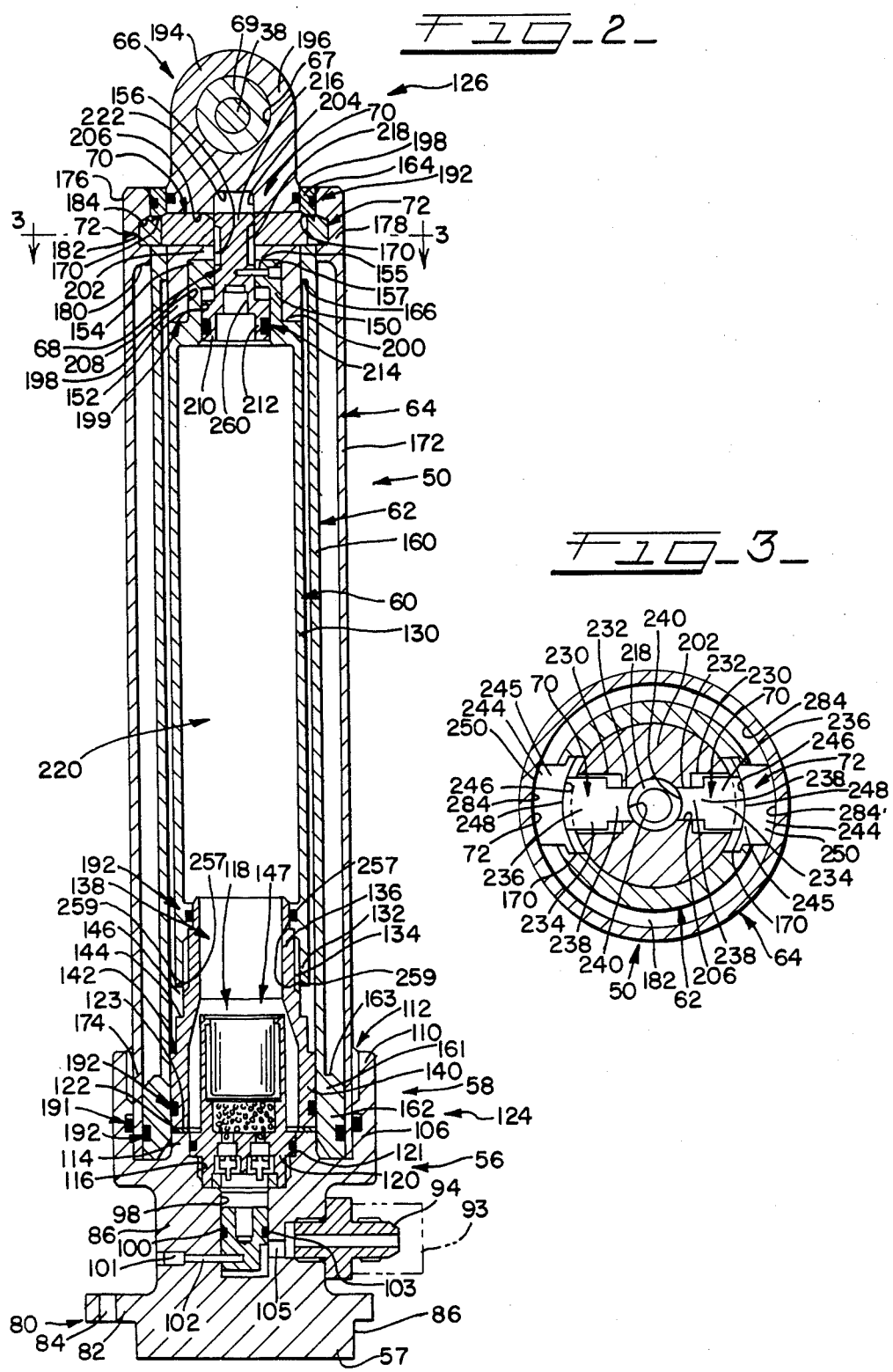

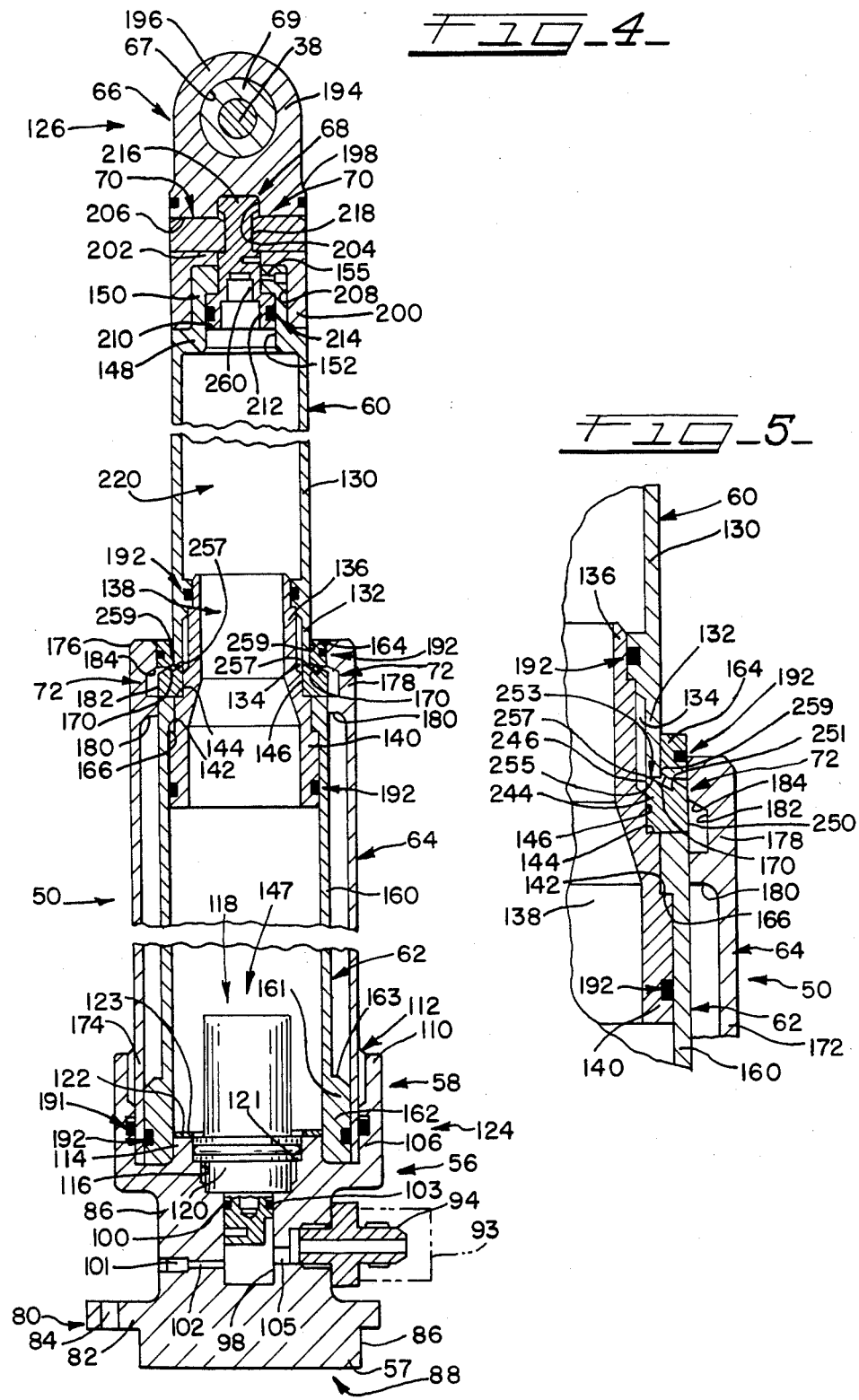

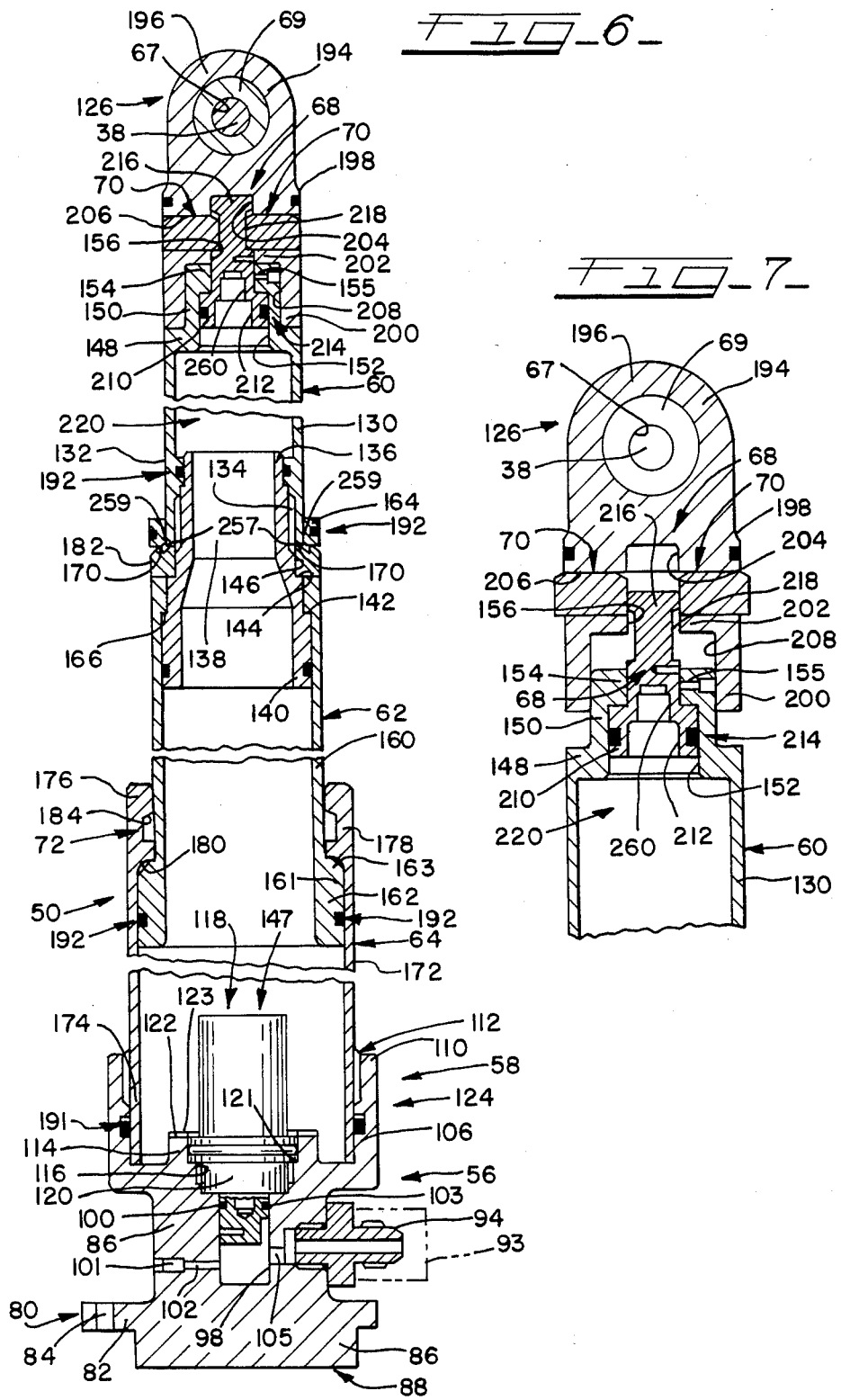

EMERGENCY REMOVER DEVICE FOR EJECTING AIRCRAFT CANOPIES

This invention relates to a remover device for starting the ejection movement of the canopy of aircraft emergency in-flight situations, as where the pilot is to be ejected, and more particularly, to an aircraft canopy remover device in the nature of a telescoping multi-cylinder assembly that is adapted to be incorporated in the usual canopy opening and closing strut assembly and that is operable so long as it remains in its dormant state to be part of the indicated telescoping strut assembly in performing the canopy opening, closing, and holding functions of that strut assembly.

It has long been common practice in connection with training and fighter aircraft to provide for ejection of the aircraft canopy under inflight emergency situations, as a result of which the aircraft pilot actuates emergency equipment that later results in him being ejected from the aircraft for parachute descent. The aircraft itself that is equipped to provide for ejection removal of the aircraft canopy may be a single seater aircraft, or designed for two individuals seated side by side, only one of whom is the pilot or is designated to act as the pilot. In aircraft of this type, the aircraft canopy is mounted and pivoted to swing about a horizontal axis to the rear of the pilot seat that is of the type that permits the canopy to blow away rearwardly of the aircraft under the motion of the aircraft, when swung about its said pivotal axis for that purpose.

A familar way of opening, closing, and holding open or closed, the canopy of such aircraft is to provide an extensible and retractable strut assembly that is disposed in a more or less upright position rearwardly of the aircraft seat or seats in approximate alignment with the aircraft longitudinal center axis. Such extensible and retractable strut assembly is pivotally anchored at its base to the aircraft framework for pivoting about a horizontal axis that extends generally transversely of the aircraft longitudinal axis, and the strut assembly is also pivotally connected to the canopy to swing the canopy upwardly about another horizontal pivot axis that parallels the strut base pivot axis and is located rearwardly above the base pivot axis and at a level above the top of the aircraft fuselage. The strut assembly in question is usually provided with suitable hydraulic, electric, or other means to extend and retract same to open and close the canopy, or hold it in one of these positions, so that the aircraft personnel that are to occupy the seat or seats can have access to same and leave same through the aircraft aircraft fuselage opening which the canopy is to cover.

It has also been conventional practice to have such extensible and retractable strut assembly accommodate a canopy remover section at the strut assembly upper end, to serve canopy ejection purposes in emergency situations, with the operation of the canopy remover being initiated by the aircraft pilot by way of a suitable hand grip device conveniently located within the pilot's reach when seated in the aircraft, that activates a suitable initiator device that is part of a ballistic system in which, on operation, gas under high pressure is released and directed through appropriate piping to the various pieces of emergency equipment to be actuated under emergency in-flight conditions, some explosively, usually preliminary to ejection of the plane personnel for parachute descent to safety.

Conventional canopy ejectors when actuated to eject the canopy effect a high pressure force application to the canopy at the beginning of their actuation, but this tapers off as the ejection proceeds, leaving to chance that the forward motion of the aircraft in flight will be enough in combination with the ejection action of the canopy remover to throw the canopy rearwardly enough to effect its release from the aircraft preliminary to ejection of the aircraft personnel.

A principal object of the present invention is to provide a canopy remover device that, when emergency in-flight procedures are undertaken preliminary to ejection of the aircraft personnel from the aircraft, acts to apply to the aircraft canopy the unbalanced outwardly acting force that is needed for in-flight canopy ejection in a more or less uniform manner over the ejector device stroke, to maximize the ejecting motion momentum of the canopy provided by the canopy remover device, and also provide for disconnection of the canopy remover device from the canopy without detracting from such momentum, and in a reliable and fail safe manner.

Another principal object of the invention is to provide a canopy remover device in the form of a telescoping multi-cylinder assembly that may be applied at the upper end of the familiar aircraft canopy opening and closing strut assembly, to act as part of such strut assembly in the normal opening, closing, and hold down action that said strut assembly is to have on the canopy, in the dormant state of the canopy remover device, but when inflight emergency ejection procedures are initiated preliminary to aircraft personnel ejection, the canopy remover device is actuated as part of those emergency procedures to apply to the canopy the unbalanced force that is required to not only open the canopy but also throw it upwardly of the aircraft, about the indicated canopy pivotal connection to the aircraft, so that the canopy has maximized momentum in swinging about its pivot axis rearwardly of the aircraft whereby the canopy will swing the full amount required to free it fail-safe from the aircraft for free fall clear of the aircraft in the desired manner preliminary to ejection of the aircraft personnel.

Yet another object of the invention is to provide a canopy remover of the type indicated that is of few and simple parts, that is arranged to be actuated by conventional emergency initiator equipment, that prior to using same for in-flight removal of the canopy, the canopy remover device in its dormant state forms a part of the extensible and retractable strut assembly for normally operating the canopy, and with consistent reliability, but when in-flight emergency removal of the canopy is to be effected, the remover device will reliably operate, using the usual initiator equipment to actuate same, to effect canopy removal from the aircraft, that is economical of manufacture and that while, when applied to the aircraft, it becomes a part of the familiar canopy positioning and controlling strut and it may be so utilized in its dormant state for an extended period, without adverse affecting its operation for canopy removal purposes, when the indicated inflight emergency procedures need to be effected, on putting into operation of the indicated conventional emergency equipment, the remover operates in a fail-safe manner to effect canopy removal.

In accordance with the invention, the canopy ejector or remover comprises an assembly that includes an inner cylinder, an intermediate cylinder in which the inner cylinder is lodged, and an outer cylinder that is fixed in place and within which the intermediate cylinder is received. The assembly includes a canopy fitting that is pivotally connected to the canopy, with the assembly as applied to the aircraft being fully contracted, and self keyed and shear pin locked or latched in such contracted relation in its dormant mode, and made a part of the familiar extensible and contractable strut assembly that is normally employed to open and close aircraft canopy where the aircraft is of the type having a canopy. As installed, the assembly includes a conventional ballistic gas forming cartridge that is connected to the emergency initiator system with which the aircraft is equipped so that when, inflight, a decision is made to eject the aircraft personnel for parachute descent, and the aircraft pilot actuates the usual conventional initator to actuate the emergency equipment involved, the cartridge of the remover of this invention is ignited to generate ballistic gas therein for causing the canopy ejector of this invention to unlatch itself and effect movement of the inner cylinder out of the intermediate cylinder and subsequent movement, without halting the remover assembly extension operation, of the intermediate cylinder outwardly of the fixed outer cylinder, to give the canopy the requisite momentum for full ejection of the canopy preliminary to pilot ejection, with the connection of the canopy remover to the canopy being automatically discontinued by the continued movement of the canopy away from the aircraft, and without detracting from the ejection momentum that has been applied to the canopy.

Other objects, uses, and advantages will be obvious or become apparent from a consideration of the following detailed description and the application drawings in which like parts are indicated by similar reference numerals throughout the several views.

In the drawings:

FIG. 1 is a diagrammatic fragmental vertical sectional view through a typical aircraft arranged to provide for canopy removal illustrating diagrammatically the location of the aircraft personnel, such as the aircraft pilot, the aircraft seat that is normally ejected to eject the aircraft personnel occupying same from the aircraft in-flight, the location of the conventional extensible and retractable strut assembly that is employed to move the aircraft canopy between its open and closed positions and hold the aircraft canopy open or closed, the general arrangement for pivotally mounting the canopy on the aircraft, and the application of the canopy remover device of the present invention to the indicated canopy positioning strut in the operative, but dormant, mode of same;

FIG. 2 is a diagrammatic enlarged longitudinal sectional view of the multi-cylinder canopy remover device of the present invention, taken substantially along the centerline of the strut of FIG. 1, showing the remover in its dormant mode;

FIG. 3 is a diagrammatic cross-sectional view taken essentially along line 3—3 of FIG. 2, illustrating details of construction showing the latch key arrangement employed in the canopy remover of the present invention for assisting in holding the remover in its dormant retracted mode;

FIG. 4 illustrates the canopy remover of the present invention after the device has been actuated for canopy removal for ejection (preliminary to ejection of the aircraft personnel), showing the canopy remover and its canopy associated fitting component disposed, under the ballistic gas pressure action that is provided within the device when it is put into its active mode by the aircraft pilot initiating the aforementioned emergency in-flight procedures, in which the device inner cylinder has reached the limit of its travel within the device intermediate cylinder, with the device components positioned just prior to release of the device intermediate cylinder from the device outer cylinder for further extension of the device intermediate cylinder to effect further imposition of thrust on the canopy by the operation of the remover device in a continuous, more or less, uniform manner;

FIG. 5 is a fragmental view, on an enlarged scale, showing one side of the device inner, intermediate and outer cylinders in their relative positions, at the position which the intermediate cylinder is fully released from the outer cylinder, for movement to the further extended position shown in FIG. 6;

FIG. 6 is a view similar to that of FIG. 4, but showing the canopy remover device fully extended at the end of its canopy ejection force applying stroke, for effecting the throwing action on the canopy rearwardly of the aircraft, that is indicated by the arrow of FIG. 1; and FIG. 7 is a fragmental view of the end of the canopy remover device that is secured to the canopy, indicating the manner in which the momentum of the canopy, in swinging to the rear of the aircraft, disconnects, automatically, the canopy remover device from the canopy.

However, it is to be distinctly understood that the specific drawing illustrations provided are supplied primarily to comply with the requirements of the Patent Laws, and that the invention is susceptible of other embodiments and modifications that will be readily apparent to those akilled in the art, which are intended to be covered by the appended claims.

GENERAL DESCRIPTION

Background of Invention

Referring first to FIG. 1, reference numeral 10 generally indicates an aircraft of the type to which the invention is applicable, wherein the aircraft 10 defines a personnel compartment 12 that is open at the top of the aircraft 10 and is closed by a conventional canopy that is generally indicated at 14. The canopy 14, which may be of any suitable type, is partially shown in solid lines, in its closed position, in FIG. 1, and in broken lines the position it assumes in the open position of the canopy. The stroke of the canopy remover device of the present invention, in shifting from its retracted relation of FIG. 1 to its extended relation of FIG. 6 (as will be described in detail subsequently), involves a stroke of approximately fifteen and one-half inches in a preferred embodiment.

The aircraft 10 in practice ordinarily is of the training or fighter craft type and may be a single seater for the pilot, or designed for two aircraft personnel to be seated side by side, in which case one of the individuals involved is the aircraft pilot and the other individual is the co-pilot (training the aircraft are usually of this type).

In the showing of FIG. 1 the aircraft 10 is shown equipped with the usual upwardly ejectable seat 16 on which the individual 18 is seated for in-flight purposes. The canopy 14 with which the aircraft 10 is equipped may be any one of the various makes and models offered at the present time for aircraft of the type indicated, with most of the canopy being omitted, and what is shown being diagrammatically illustrated to indicate the familiar lug structure 20 that is fixed with respect to the canopy 14 and defines open swing or pivot seat 22 that swingably engages pin 24 that is fixed to the aircraft framework to define a swing axis 26 that extends crosswise of the aircraft fuselage and is generally horizontally disposed when the aircraft rests on the ground at an airport or the like.

Located rearwardly of the seat 16 is the familiar extensible and retractable strut assembly 30 that is provided to open and close the canopy and hold it in either open or closed position, to permit aircraft personnel access to and from the aircraft compartment 12. The strut assembly 30 comprises extensible and retractable section 32 that for purposes of the present invention may be entirely conventional in nature, and that is pivotally mounted on suitable pin 34 that is fixed to the aircraft framework to define pivot axis 36 that parallels the pivot axis 26.

The canopy 14 further includes suitable pin 38 suitably anchored to and between a pair of spaced apart appendages 40 of the canopy lug structure 20 to define a pivot axis 42 that connects the strut assembly 30 to the canopy 14 for purposes of shifting same between its open and closed positions, about the pivot axis 26, by extension and retraction of the conventional section 32, which, as is well known in the art, may be actuated hydraulically, electrically, or the like, depending on the make and model of the section 32 selected for a particular aircraft.

The canopy remover of the present invention is shown diagrammatically in FIG. 1 where indicated by reference numeral 50, and is interposed between the strut section 32 and the canopy lug portion 40 for application to the canopy pin 38 in the manner that will be disclosed hereinafter in detail.

The remover device 50 in its dormant mode is keyed in its dormant retracted relation for operation as a fixed link between strut section 32 and the aircraft canopy pin 38 for normal operation of the strut assembly 30 to open and close the aircraft compartment 12 for personnel access to and from the compartment 12 when the aircraft is parked at an airfield or landing strip.

It is assumed that the aircraft 10 is equipped to actuate the strut section 32 to extend and retract in one of the conventional manners currently employed, whereby the aircraft compartment 12 may be open for personnel access thereto for seating in the one or two seats that are in the compartment 12, and that the aircraft 10 is equipped for ejection of the seat or seats 16 from the aircraft, under emergency in-flight conditions, in which the aircraft pilot, or the individual designated beforehand as the aircraft pilot, has available to him within easy reach a conventional emergency action initiator device arrangement. As is well known to the art, actuation of such initiator devices brings into play a so-called ballistic system in which, when a gas is the agency relied on, gas under high pressure is released and directed through appropriate piping to various pieces of emergency equipment with which the aircraft is equipped and that is to be actuated under inflight emergency conditions, sometimes explosively.

In accordance with the present invention, the conventional initiator device (not shown) is relied upon to supply ballistic gas to the canopy ejection device 50 for opening and ejecting the canopy preparatory to the seat or seats 16 being ejected from the aircraft compartment 12 in an upward direction to carry the individual 18 in the seat involved free of the aircraft for parachute descent to ground level safety.

The canopy remover device 50 is shown in detail in FIGS. 2-7, FIGS. 2 and 3 showing the remover device 50 in its retracted, dormant mode position, and FIGS. 4-6 showing the device 50 in its activated mode at different relations of projection from the dormant mode of same.

FIG. 7 is a sectional view similar to that of FIG. 6 but showing the manner in which the momentum of the canopy that has been achieved by the operation of remover device 50 separates the connection between the remover device 50 and the canopy, as will be explained in detail hereinafter.

THE INVENTION CANOPY REMOVER

Referring now more specifically to FIGS. 2-6 of the drawings, the canopy remover device 50 comprises a telescoping multi-cylinder assembly 55 comprising a base plate structure 56 formed from a suitable metallic material, having a base plate section 7 that is to be suitably mounted on the actuating section 32 of the strut assembly 30, and a retainer section 58 that is integral with the base plate structure 56; assembly 55 further comprises an inner cylinder 60, an intermediate cylinder 62, and an outer cylinder 64 that is made fast to the retainer section 58, as will be described hereinafter. The remover assembly 55 also comprises canopy fitting 66 that is apertured as at 67 to receive an annular bearing 69 that is swivably mounted in conventional rod end fashion, in the fitting 66, which bearing 69 receives in journalling fashion the pin 38 that keys the fitting 66 to the canopy 14. Cooperating between the inner cylinder 60 and the canopy fitting 66 is release piston 68. The assembly 55 is held in its retracted dormant mode (the position of FIG. 2) by a pair of inner latch keys 70 and a pair of outer latch keys 72 that key the respective unit cylinders together and to the canopy fitting 66 in the contracted dormant relation of the device 55 (see FIGS. 2 and 3), and a shear pin 155 that is described in further detail hereinafter.

The base plate section 57 as illustrated comprises a plate portion 80 that is essentially round in plan and defines laterally extending flange 82 that is apertured as at 84 to define a number of bolt receiving openings that may be of any desired number (four such apertures spaced apart 90 degrees in a successful embodiment) with suitable bolt and nut assemblies being applied to apertures 84 as needed to mount the assembly 55 in fixed coaxial relation with the strut assembly 30. The base plate structure 56 includes neck portion 86 that threadedly receives fitting 94 adapted for conventional connection to a conduit 96 (see FIG. 1) that is connected to a source of the indicated activating ballistic gas when it is released from a conventional initiator by the aircraft pilot when it has been determined that in-flight ejection of the aircraft personnel from compartment 12 is the course of action to be taken. Fitting 94 is closed by a suitable caplug 93 (shown in dashed lines) for shipping purposes (which is removed when the assembly 55 is to be installed).

The base plate structure 56 is also formed to define annular chamber or bore 98 in which is mounted a piston 100 that is keyed in its dormant position shown in FIG. 2 by suitable shear pin 102 backed up by set screw 101; piston 100 is forced upwardly of the bore 98 by the ballistic gas that is supplied to the fitting 94, and chamber 98 via passage 105 when the assembly 55 is to be activated to eject the canopy. Piston 100 carries annular O-ring seal 103 that is in fluid sealing relation with the bore surfacing three hundred sixty degrees thereabout.

The retainer section 58 comprises a mounting member portion 106 formed to define annular flange 110 within which the cylinders 60, 62, and 64 are disposed in upright relation, and in the telescoping relation shown in FIG. 2 in the dormant mode of the device that is shown in FIG. 2. The outer cylinder 64 is fixed to the flange 110, as by employing a suitable bonding material therebetween, where indicated at 112, which may be a suitable epoxy or other bonding material suitable for bonding metal components together.

The mounting member portion 106 also defines an inner annular wall structure 114 that is centrally recessed at 116 for the purpose of receiving a conventional explosive cartridge 118 that is disposed within the assembly 55 in the mounted relation of same to activate the assembly 55 when the indicated ballistic gas is supplied thereto in the manner already indicated. The cartridge 118, which may be of the Navy CCU-22 type or its equivalent, is conventionally equipped with the usual cartridge igniter arrangement in its base 120, with the cartridge base 120 resting on the annular seat 121 defined by mounting member wall 114 in the dormant mode of the assembly 55. The function of the piston 100 is to be forced upwardly against the cartridge base 120 to effect ignition of same in a conventional manner, when the indicated ballistic gas is supplied to fitting 94 in the manner previously indicated. Cartridge 118 is preferably threadedly mounted in recess 116.

As indicated in FIG. 2, in the dormant mode of the assembly 55, the intermediate cylinder 62 is received between the mounting member annular flange 110 and wall structure 114, and the wall structure 114 is formed to define the annular land 122 on which the inner cylinder 60 rests, and about the cartridge 118. In the form shown suitable shim 123 is interposed between land 122 and inner cylinder 60.

It will thus be seen that the assembly 55 and its base plate structure 56 define one end 124 of same that is adapted to be mounted within the aircraft 10 in the manner suggested in FIG. 1, while the canopy fitting 66 defines the other end 126 of the assembly 55 that is connected to the canopy 14.

The inner cylinder 60 comprises a main shell section 130 that at its lower end 132 is internally threaded as at 134 to threadedly receive one end 136 of a annular cartridge receiver 138, the other end 140 of which is shouldered to define annular stop surface 142. The cartridge receiver 138, which is preferably formed from 7075 aluminum alloy, is also formed to define annular shoulder 144 that is spaced from the shell end 132 to define annular recess 146 that is external and about the inner cylinder 60. Receiver 138 defines a chamber 147 in which cartridge 118 is to be received; chamber 147 is proportioned so that the ballistic gas when emitted from cartridge 118 will reach down about the cartridge to apply its bias to the inner cylinder 60 at this area of the device 50.

The shell 130 at its upper end 148 defines tubular stud portion 150 in which the release piston 68 is mounted for sliding movement in the active mode of device 50. The stub portion 150 defines bore 152 and apertured end portion 154 forming centrally located aperture 156 for this purpose, with release piston 68 being held in the inactive mode by the aforementioned shear pin 155 backed up by set screw 157 that is recessed into stub portion 150 of shell 130.

The intermediate cylinder 62 comprises an elongate metallic shell 160 that at its lower end 162 seats on mounting member 106 about well structure 114 and is shouldered at 161 to define annular stop surface 163; at its other end 164 shell 160 defines annular stop surface 166 with which the stop surface 142 of the inner cylinder 60 is to cooperate in the extended relation of the assembly 55. The end 164 of the sleeve 160 is also oppositely apertured to define opposing apertures 170 with which the pairs of keys 70 and 72 are to cooperate, as will be fully described hereinafter.

The outer cylinder 64 comprises a metallic shell 172 that at its lower end 174 is bonded to the assembly retainer section 58, and that at its upper end 176 is shouldered as at 178 to define annular stop surface 180. The upper end 176 of the outer shell 172 is also formed to define annular recess 182 formed with an annular conical or slanted cam surface 184, in which the outer latch keys 72 are disposed in the dormant mode of the remover assembly 55.

The inner, intermediate, and outer cylinders 60, 62, and 64 are also formed to provide the customary elastomeric O ring seals mounted in annular grooves therefor for good sealing action with the components engaged by the seals, where indicated by reference numeral 190. The mounting member 108 is provided with a similar seal 191.

The canopy fitting 66 comprises a metallic body 194 formed to define lug portion 196 in which the aperture 67 is formed, and annular flange portion 198 that is formed to fit within the recess 199 defined by the intermediate and inner cylinders 60 and 62 about the inner cylinder stud portion 150 cylinder at its upper end 164, and specifically against the annular seat 200 defined thereby. Fitting 66 also defines stud portion 202 and its bore 204, that extends longitudinally thereof in centered relation thereto, with which the release piston 68 cooperates, as well as cross bore 206 in which the inner latch keys 70 are disposed in the dormant mode of the assembly 55. The canopy fitting body stud portion 202 is also formed to define counter bore 208 that conforms to the configuration of the inner cylinder stud portion 150.

The release piston 68 comprises piston head 210 that is in close fitting sliding engagement with the inner cylinder stud portion bore 152, which piston head is formed to define groove 212 that receives the sealing O ring 214 that is in sealing relation to the bore 152. Integral with the piston head is the stem 216 that intermediate its ends is formed to define a necked portion 218 with which the inner latch keys 70 are to cooperate in the practice of the invention, when the assembly 55 is actuated.

The inner cylinder 60 thus will be seen to define a chamber 220 that communicates between the cartridge 118 and the release piston head 210. The stem 216 of the release piston 68 extends outwardly of the opening 156 defined by the inner cylinder tubular stud portion 150, in close fitting relation thereto, and into close fitting relation with the bore 204 defined by the canopy fitting 66 that terminates in a bore end portion 222.

As indicated in FIG. 3, the cross bore 206 of the canopy fitting stud portion 202 defines radially outer enlarged portions 230 and radially inner narrow portions 232. The inner latch keys 70 comprise identical relatively flat metallic bodies 234 each defining a larger body portion 236 against which the outer latch key 72 adjacent same acts (in the dormant mode of the assembly 55), and a neck portion 238 formed to define a concave seat 240 that has a concave curving which complements the convex surfacing diameter of the release piston stem 68 (as distinguished from its neck portion 218).

The outer latch keys 72 are oppositely disposed metallic bodies 244 that each define inner ends 245 having inner concavely arcuate bearing surfaces 246 that complement the shaping of the corresponding convexly contoured outer ends 248 of the inner latch keys 70; the bodies 244 define outer end portions 250 that are convexly curved in complementary configuration to the outer or larger diameter of the annular recess 182 that is defined by the outer cylinder 64, all as indicated in FIG. 3. The radially inner portions of the upper or canopy facing sides 251 of the outer latch keys 72 are preferably knurlled as at 253 to form one or more grooves 255 that are complemental and receive the angled edging 257 that is defined by the lower terminal portion 259 of the inner cylinder shell 130, for lock up purposes, as part of the extension stroke of assembly 55 (as will be later referred to, but see FIG. 5).

The device 50 is supplied preassembled with the cartridge 118 and the base plate structure 56 in place, and with the component parts of the device being disposed and held in the dormant relation of the device that is shown in FIG. 2 by keys 70 and 72 and shear pins 102 and 155. The inner cylinder is preferably assembled separately with the canopy fitting 66 and cartridge receiver applied thereto; the release piston 68 is threaded at 260 for threaded application to an elongate assembly rod and is inserted through the inner cylinder 60 from the end 140 of same (which is then open), and has its stem 216 applied to the fitting bore 204. The fitting 66 is adjusted to line up the holes in which shear pin 155 is to be received. After application of pin 155 and set screw 157, the release piston assembly tool is removed. The base plate structure 56 with the cartridge 118 applied thereto may then be assembled. The intermediate cylinder 62 with the outer latch keys 72 applied to its apertures 170 is applied to the outer cylinder, and after the two inner latch keys 70 are applied to the canopy fitting 66 (in the proper orientation) the canopy fitting 66 is inserted in place, with the parts being shifted as needed to properly engage the latch keys as indicated in FIGS. 2 and 3. The inner cylinder 60 may then be applied to the assembled outer and intermediate cylinders 64 and 62.

As a practical matter, assembly may be effected in any suitable manner, with grease, seals, adhesives, etc. being applied as needed. The device 50 when assembled has the relation indicated in FIG. 2, in which the three cylinders 60, 62 and 64 are in the fully telescoped relation, with the release piston 68 having its upper stem portion 280 at least partially engaged by the bearing surfaces 240 of the respective inner latch keys 70, which disposes the outer ends of the inner latch keys 70 partially within the respective apertures 170 defined by the intermediate cylinder 62 and bearing against the outer latch keys 72 which are in turn in bearing relation with the bearing surface 284 defined by the annular groove 182. In the dormant mode of assembly 55, the canopy fitting 66 is seated within the assembly top recess 199 in substantially complementary fitting relation with the inner cylinder stud portion 150. As the outer cylinder 64 is fixed with respect to base plate structure 56, the inner and outer latch keys 70 and 72 key together the inner cylinder 60, the intermediate cylinder 62 the outer cylinder 64, and the canopy fitting 60, and shear pin 155 keys the release piston 68 with respect to the inner cylinder 60, all the components of the assembly are held in the keyed relation to the outer cylinder 64 as illustrated in FIG. 2.

When a particular assembly 55 is to be applied to a particular aircraft 10 and made a part of the strut assembly 30, the base plate structure 56 is suitably affixed to the section 32 of strut assembly 30; the canopy pin 38 is suitably connected to the canopy fitting 66, and the fitting 94 is exposed and suitably connected to the ballist gas supplying conduit 96.

During normal operation of the strut assembly 30, its conventional section 32 is extended and retracted as needed to open and shut the canopy through the assembly 55 which stays contracted in its dormant mode. This may last for the period of time the aircraft 10 is in active use.

It is only when the aircraft pilot determines that inflight conditions warrant personnel ejection for parachute descent, whereupon the aircraft pilot on making this decision actuates by hand the usual initiator device with which aircraft are equipped for such purposes, which generates the ballistic gas that is supplied to the assembly 55 through conduit 96 as part of the emergency system involved.

The supplying of the ballistic gas to the base plate fitting 94 acts on the piston 100 to so upwardly direct piston 100 that the shear pin 102 is sheared off, with the result that the piston 100 is then forcably moved against the conventional igniting mechanism of cartridge 118 that is carried by its base 120, which then causes the generation by cartridge 118 of further ballistic gas that emerges under high pressure from the cartridge into chamber 220 of the inner cylinder and also against the release piston 68 and in particular its head 210 (as indicated by the arrows of FIG. 4).

Thus, the igniting of the cartridge 118 starts the active mode of the assembly 55, to effect removal of the canopy 14, with the arrangement being such, in accordance with the present invention, that as the device 50 moves from its retracted relation (FIGS. 2 and 3) to its extended relation shown at FIG. 6, the unbalanced throwing force applied to the canopy 14 to swing it rearwardly of the aircraft is more or less equalized throughout the stroke of the remover 50. In this connection, it is preferred that the ballistic gas pressure initially emitted into the inner cylinder chamber 220 being on the order of 400 to 600 psi.

In the first phase of the active mode of the remover 50, the high gaseous pressures acting on the release piston 68 shears pin 155 and then shifts the release piston 68 upwardly of FIG. 2 to bring its necked portion 218 into full alignment with the latch keys 70 and 72. The same pressure also biases the inner cylinder 60 upwardly of the intermediate cylinder 62 and applies a radially inward thrust to the latching keys 70 and 72 by way of the outer cylinder cam surface 184, and when the inner latch keys 70 seat within the release piston stem neck portion 218 under such thrust, the inner cylinder 60 is unlocked from the intermediate cylinder 62 and moves outwardly and upwardly thereof and the outer cylinder 62 to bring its stop surface 142 against the stop surface 166 of the intermediate cylinder 62; the upwardly directed force then acting on the intermediate cylinder 62 results in the cam surface 184 of the outer cylinder 64 caming the outer keys 72 from the position of FIG. 4 to the position of FIG. 5, wherein they are wholly removed from the outer cylinder recess 182, and the intermediate cylinder 62 is thus released to smoothly continue the extension of remover 50 toward the relation of FIG. 6. In this connection, the outer keys 72 on being so cammed are driven under the angled edging 257 of the inner cylinder shell 130, as best seen in FIGS. 5 and 6, to seat edging in the key grooves 255 to lock keys 72 in fully retracted position (in which their inner ends 245 are disposed in the inner cylinder external recess 146).

The component parts of the remover 50 thus continue to continuously shift from the relation of parts shown in the respective FIGS. 2 and 3 to the relation of parts shown in FIG. 6, at which point the stop surface 163 of the intermediate cylinder 62 engages against the stop surface 180 of the fixed outer cylinder 64 to stop the extension movement of device 50. This is the relation of the parts of the canopy remover 50 as shown in FIG. 6.

While the ejecting action of the remover 50 on the canopy is completed when the components of the remover reach the position of FIG. 6, the momentum of the canopy that has resulted during the active mode of the remover, and specifically the action of the assembly 55 in extending from the contracted relation of FIGS. 2 and 3 to the extended relation shown in FIG. 6, results in the canopy 14 being swung rearward of the aircraft toward the angulation at which it is designed to disconnect from the aircraft. Such momentum effects disconnection of the canopy fitting 66 from the remover device release piston 68, as indicated in FIGS. 6 and 7. Since the inner latch keys 70 are freely slidable in the respective portions of the cross bore 206 on either side of bore 204, the momentum of the canopy (to which canopy fitting 66 remains connected) pulls the release piston stem 216 from the canopy fitting 66, and specifically from its bore 204, with the result that the canopy 14 is then completely disconnected from the strut assembly 30 and continues to swing rearwardly of the aircraft, and now under the air pressure created by forward movement of the aircraft in the in-flight condition in question, for disconnection of the canopy at the pin 22 for complete freeing of the canopy from the aircraft for free fall to the earth; ejection of the aircraft personnel from the aircraft follows using known techniques and devices.

It will thus be seen that the remover of the present invention is self latched in its dormant mode, fully retracted relation, in which it serves a portion of the operative length of the strut assembly 30 for normal opening and closing of the canopy and holding of the canopy in either such position. However, when under emergency inflight conditions the aircraft pilot determines that parachute descent is warranted because of emergency conditions obtaining, the remover 50 is actuated as part of a preliminary emergency actions taken to eject the canopy in the manner indicated, prior to ejection of personnel for parachute descent to safety.

Further, in the remover 50, the outer cylinder remains in fixed relation to its mounting in the aircraft, while the ballistic gas pressure activated within the device 50 first unkeys the inner cylinder from the intermediate cylinder, which then emerges from the intermediate cylinder, to effect unkeying of the intermediate cylinder from the fixed outer cylinder, which then emerges from the outer cylinder. In the particular device illustrated, the smaller diameter inner cylinder moves first during the interval when the ballistic gas pressure from the cartridge is the highest; the intermediate cylinder which is of larger internal diameter, moves last, carrying the inner cylinder and canopy fitting with it, and moving with respect to the fixed outer cylinder. This results in the unbalanced force being applied to the accelerated load, namely the canopy, acting in a more or less smoothly applied uniform force as the inner and intermediate cylinders consecutively extend.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A pilot actuated emergency aircraft canopy ejector device, said device comprising:

a telescoping cylinder assembly, one end of said assembly being adapted to be mounted within the aircraft in thrust resisting relation thereto and the other end of said assembly being connected to the canopy, said assembly including an inner cylinder, an intermediate cylinder, and an outer cylinder in telescoped substantially coaxial retracted relation, said inner cylinder at one end of same defining with said assembly one end a chamber for receiving a ballistic gas generating cartridge and at the other end of same forming said other end of said assembly and defining a fitting formed for providing a pivotal axis connection to the canopy, said fitting slidably mounting within same a release piston extending longitudinally of said inner cylinder and having an enlarged piston head mounted for shifting movement longitudinally of the inner cylinder and a stem projecting towards said pivotal axis and received in said fitting, said release piston stem having a necked portion formed intermediate its end, with the inner cylinder defining a ballistic gas expansion chamber that is open to the cartridge chamber and exposed to said piston head, said fitting adjacent said release piston stem being apertured and shiftably receiving an inner latch member that is fully retracted within said fitting when said inner latch member engages said release piston stem necked portion, with the intermediate cylinder adjacent one end of same being seated adjacent said one end of said assembly and adjacent the other end of same defining a through aperture radially aligned with said inner cylinder aperture when said one end of same is seated adjacent said one end of said assembly, with the intermediate cylinder being mounted within said outer cylinder for movement longitudinally thereof in the direction of said other end of said assembly and with the outer cylinder being fixed adjacent one end of same to said one end of said assembly against movement longitudinally thereof and defining a recess adjacent the other end thereof that is radially aligned with apertures, an outer latch member interposed between said outer cylinder recess and said inner latch member and within said intermediate cylinder aperture, said outer cylinder recess including a cam surfacing that serves to bias said latch members radially inwardly of said assembly when said inner cylinder is pressurized by the ballistic gas from the cartridge when the latter is ignited, with said inner cylinder being formed adjacent its one end with an external recess that is aligned circumferentially of said assembly with said latch members and apertures, and first means for precluding ejection of said inner cylinder from said intermediate cylinder when moved longitudinally and outwardly of said other end of said intermediate cylinder, and second means for precluding ejection of said intermediate cylinder from said outer cylinder when said intermediate cylinder is moved longitudinally and outwardly of said other end of said outer cylinder, whereby, when a cartridge disposed in said cartridge chamber is ignited to emit ballistic gas under pressure into said inner cylinder the pressure of the ballistic gas drives said release piston in the direction of said assembly other end to dispose its necked portion in coplanar relation with said latch member, said latch members are cammed radially inwardly of said assembly to release said inner cylinder from said intermediate cylinder, and said inner cylinder moves in said direction outwardly of said intermediate cylinder to the extent permitted by said first ejection precluding means, whereupon said outer cylinder recess cam surfacing cams said outer said latch member into said inner cylinder external recess to release said intermediate cylinder from said outer cylinder, whereupon said intermediate cylinder moves in said direction outwardly of said outer cylinder to the extent permitted by said second ejection precluding means, and the momentum of the canopy including said fitting, in moving in said direction, on coming into effect of said second ejection precluding means, frees said fitting from said release piston stem for effecting ejection of the canopy from the aircraft.

2. The aircraft canopy ejector defined by claim 1 wherein:

said inner cylinder and said intermediate cylinder at said ends thereof are each formed with a second aperture, and said outer cylinder and said inner cylinder are formed to define oppositely facing of said recesses, and a second set of said inner and outer latch members coaxial with said release piston stem including its neck portion.

3. The aircraft canopy ejector defined by claim 1 wherein:

said outer cylinder is fixed to said assembly one end by an epoxy bonding material.

4. The aircraft canopy ejector defined by claim 1 wherein:

said one end of said assembly is formed to transmit to a cartridge in the inner cylinder cartridge chamber an emergency initiator means for igniting the cartridge.

5. The aircraft canopy ejector defined by claim 1 wherein:

said inner cylinder and said intermediate cylinder are proportioned such that the unbalanced force applied to the canopy by said remover is substantially uniform throughout the canopy ejection stroke defined by ejector device.

6. The aircraft canopy ejector defined by claim 1 including:

means for locking said outer latch member in said inner cylinder external recess and free from projection outwardly from said intermediate cylinder.

7. A pilot actuated emergency aircraft canopy remover device adapted to be incorporated in the aircraft canopy positioning strut assembly adjacent the upper end of same, said device comprising:

a telescoping cylinder assembly, one end of said assembly being adapted to be mounted at the end of the strut assembly in thrust resisting relation thereto and the other end of said assembly being connected to the canopy, said assembly including an inner cylinder, an intermediate cylinder, and an outer cylinder in telescoped substantially coaxial retracted relation, said inner cylinder at one end of same defining with said assembly one end a chamber for receiving a ballistic gas generating cartridge and at the other end of same forming said other end of said assembly and defining a fitting formed for providing a pivotal axis connection to the canopy, said fitting slidably mounting within same a release piston extending longitudinally of said inner cylinder and having an enlarged piston head mounted in and for shifting movement longitudinally of the inner cylinder and a stem received in said fitting and projecting towards said pivotal axis, said release piston stem having a necked portion formed intermediate its end, with said inner cylinder defining a ballistic gas expansion chamber that is open to the cartridge chamber and exposed to said piston head, said fitting adjacent said release piston stem being apertured and shiftably receiving an inner latch member that is fully retracted within said fitting when said inner latch member engages said release piston stem necked portion, with the intermediate cylinder adjacent one end of same being seated adjacent said one end of said assembly and adjacent the other end of same defining a through aperture radially aligned with said inner cylinder aperture when said one end of same is seated adjacent said one end of said assembly, with the intermediate cylinder being mounted within said outer cylinder for movement longitudinally thereof in the direction of said other end of said assembly and with the outer cylinder being fixed adjacent one end of same to said one end of said assembly against movement longitudinally thereof and defining a recess adjacent the other end thereof that is radially aligned with apertures, an outer latch member interposed between said outer cylinder recess and said inner latch member and within said intermediate cylinder aperture, said outer cylinder recess including a cam surfacing that serves to bias said latch members radially inwardly of said assembly when said inner cylinder is pressurized by the ballistic gas from the cartridge when the latter is ignited, with said inner cylinder being formed adjacent its one end with an external recess that is aligned circumferentially of said assembly with said latch members and apertures, and first means for precluding ejection of said inner cylinder from said intermediate cylinder when moved longitudinally and outwardly of said other end of said intermediate cylinder, and second means for precluding ejection of said intermediate cylinder from said outer cylinder when said intermediate cylinder is moved longitudinally and outwardly of said other end of said outer cylinder, whereby, when a cartridge disposed in said cartridge chamber is ignited to emit ballistic gas under pressure into said inner cylinder the pressure of the ballistic gas drives said release piston in the direction of said assembly other end to dispose its necked portion in coplanar relation with said latch members, said latch members are cammed radially inwardly of said assembly to release said inner cylinder from said intermediate cylinder, and said inner cylinder moves in said direction outwardly of said intermediate cylinder to the extent permitted by said first ejection precluding means, whereupon said outer cylinder recess cam surfacing cams said outer latch member into said inner cylinder external recess to release said intermediate cylinder from said outer cylinder, whereupon said intermediate cylinder moves in said direction outwardly of said outer cylinder to the extent permitted by said second ejection precluding means, and the momentum of the canopy including said fitting, in moving in said direction, on coming into effect of said second ejection precluding means, frees said fitting from said release piston stem for effecting ejection of the canopy from the aircraft.

8. The aircraft canopy remover defined by claim 7 wherein:

said outer cylinder is fixed to said assembly one end by an epoxy bonding material.

9. The aircraft canopy remover defined by claim 7 wherein:

said one end of said assembly is formed to transmit to a cartridge in the inner cylinder cartridge chamber an emergency initiator means for igniting the cartridge.

10. The aircraft canopy remover defined by claim 7 wherein:

said inner cylinder and said intermediate cylinder are proportioned such that the unbalanced force applied to the canopy by said remover is substantially uniform throughout the canopy removing stroke defined by said remover.

11. The aircraft canopy remover defined by claim 7 including:

means for locking said outer latch member in said inner cylinder external recess and free from projection outward from said intermediate cylinder.

* * * * *